March 20, 1956 G. D. ROBERTS, SR 2,738,620
TREE SCARRING MACHINE
Filed April 13, 1953 4 Sheets-Sheet 1

George Dwellie Roberts, Sr.
INVENTOR.

BY *Clarence A. O'Brien*
*and Harvey B. Jackson*
Attorneys

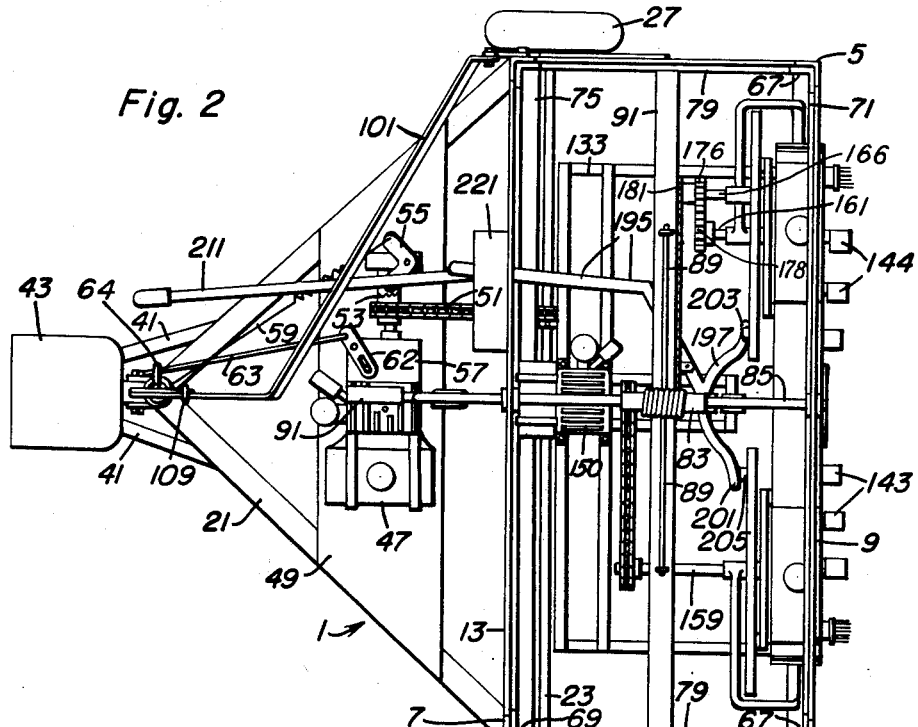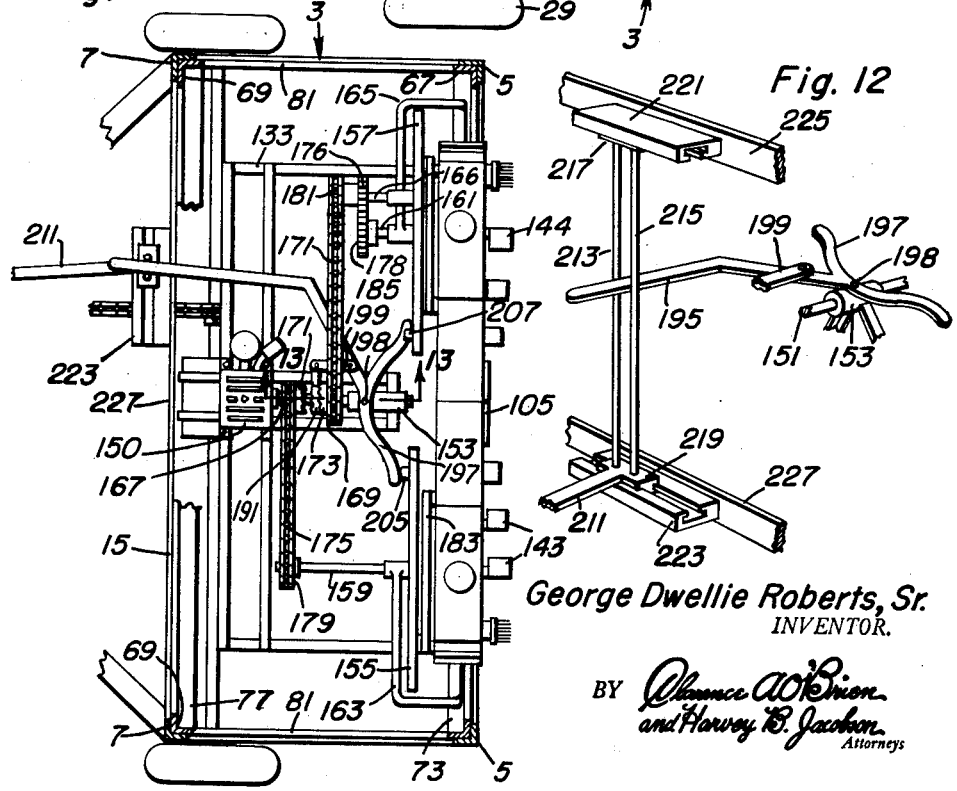

March 20, 1956    G. D. ROBERTS, SR    2,738,620
TREE SCARRING MACHINE
Filed April 13, 1953    4 Sheets-Sheet 3
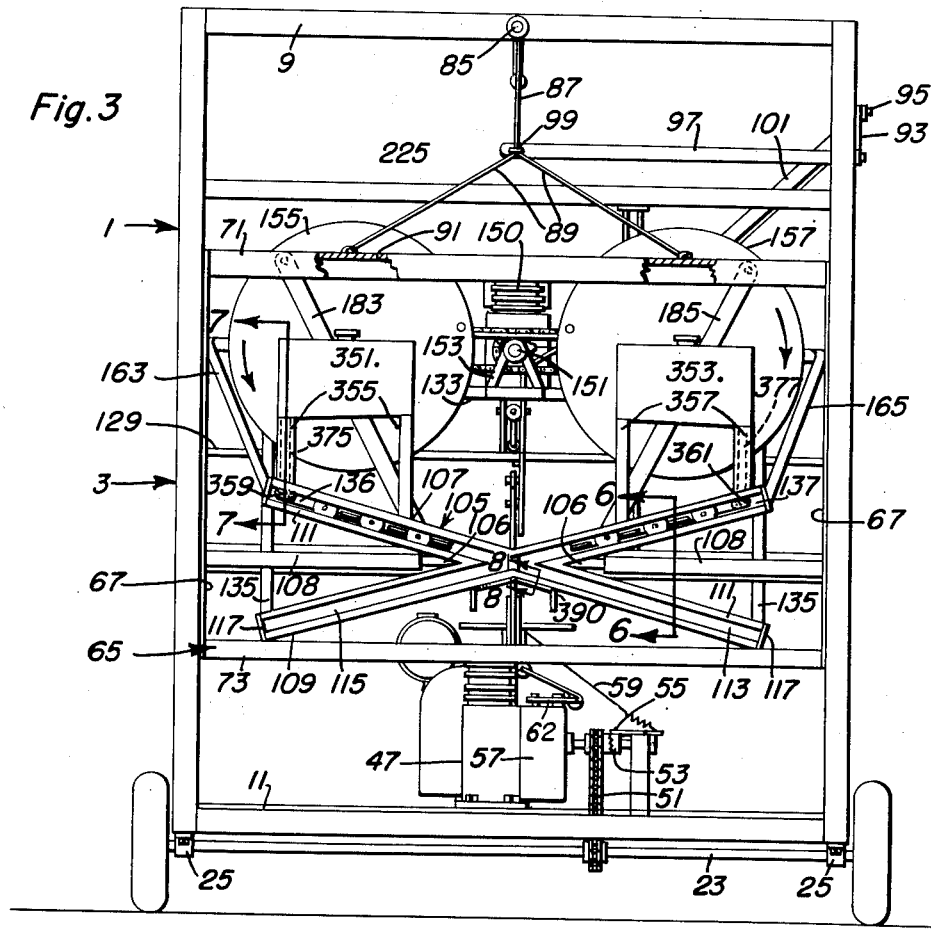
George Dwellie Roberts, Sr.
INVENTOR.

March 20, 1956  G. D. ROBERTS, SR  2,738,620
TREE SCARRING MACHINE
Filed April 13, 1953  4 Sheets-Sheet 4
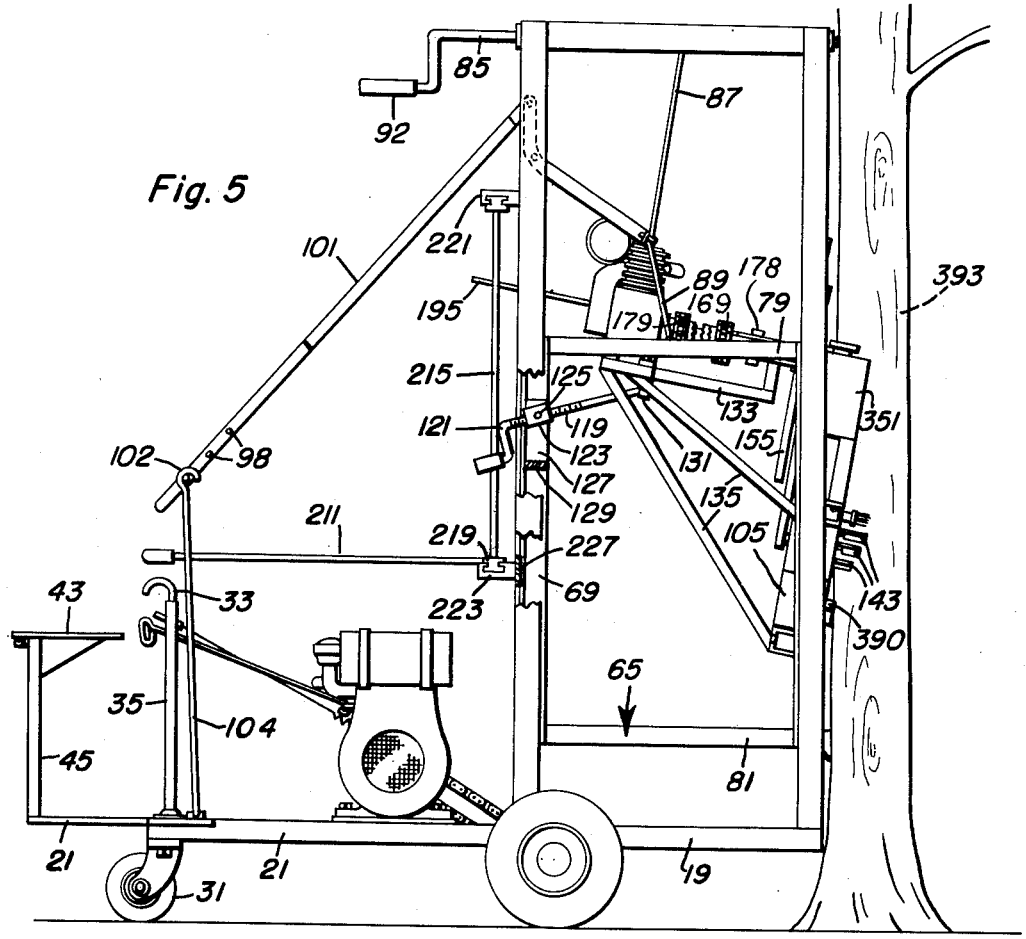
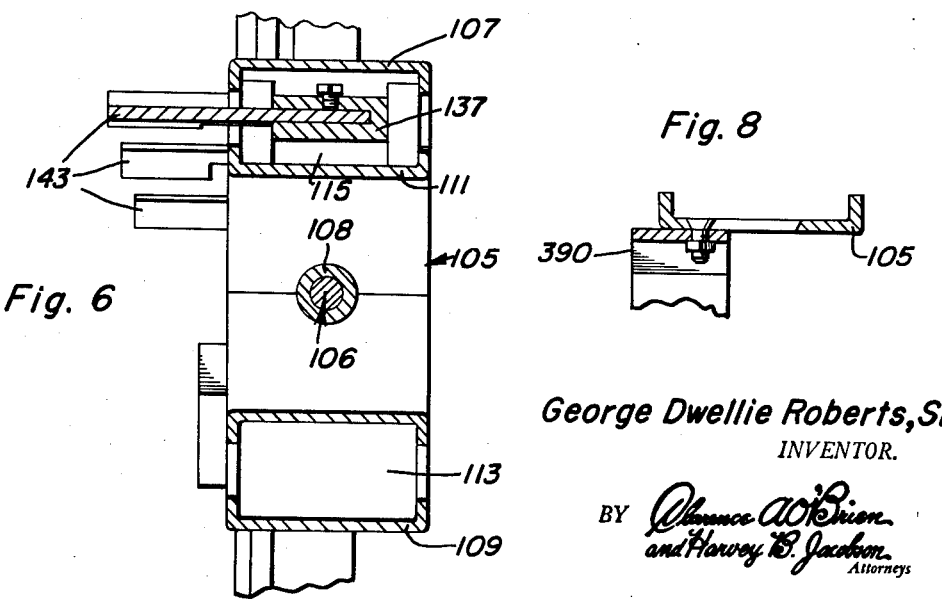
George Dwellie Roberts, Sr
INVENTOR.

United States Patent Office 2,738,620
Patented Mar. 20, 1956

2,738,620

TREE SCARRING MACHINE

George Dwellie Roberts, Sr., Philadelphia, Pa.

Application April 13, 1953, Serial No. 348,317

11 Claims. (Cl. 47—12)

My invention relates to improvements in tree scarring machines for cutting a scar or gash in trees to bleed gum therefrom into cups on the trees, especially the gum from pine trees, or the like.

The primary object of my invention is to provide a mobile motor operated machine for driving from tree to tree under control of a driver seated on the machine, the machine embodying driven cutters cutting in intersecting paths to cut a V notch in the trees of selected depth under control of the seated operator, all to the end that such scars or gashes may be cut easily and quickly and time and labor saved in the operation.

Another object is to provide a machine for the above purpose embodying improved means for applying acid to the scar or gash to prevent infection of the trees through the scar or gash.

Still another object is to provide a machine operative to cut a V-shape scar or gash in a tree by cutter carriages traveling in an X-shaped track to cut an intersecting path for cutting the V-shaped scar or gash.

Still another object is to provide in such a machine for preventing the cuttings from falling into the cups during the cutting operation.

Other and subordinate objects, within the purview of my invention, will become readily apparent when the succeeding description and claims are read in conjunction with the drawings accompanying and forming part of this specification.

In said drawings:

Figure 2 is a view in plan of the same;

Figure 3 is a view in front elevation, partly broken away and shown in section;

Figure 4 is a fragmentary view in horizontal section taken on the line 4—4 of Figure 1;

Figure 5 is a view in side elevation partly broken away and shown in section and illustrating the machine positioned for operation to cut the V-shaped scar or gash in a tree;

Figure 6 is an enlarged fragmentary view in vertical transverse section taken on the line 6—6 of Figure 3;

Figure 8 is an enlarged fragmentary view in vertical transverse section taken on the line 8—8 of Figure 3;

Figure 9 is an enlarged view in vertical section taken on the line 9—9 of Figure 7;

Figure 11 is a fragmentary view in side elevation illustrating the V-notch cut in a tree by my machine;

Figure 12 is a fragmentary enlarged view in perspective of the clutch shifting lever, the hand lever for operating the same, and parts associated with said levers; and Figure 13 is an enlarged fragmentary view in longitudinal section, partly in elevation, taken on the line 13—13 of Figure 4.

Figure 1:
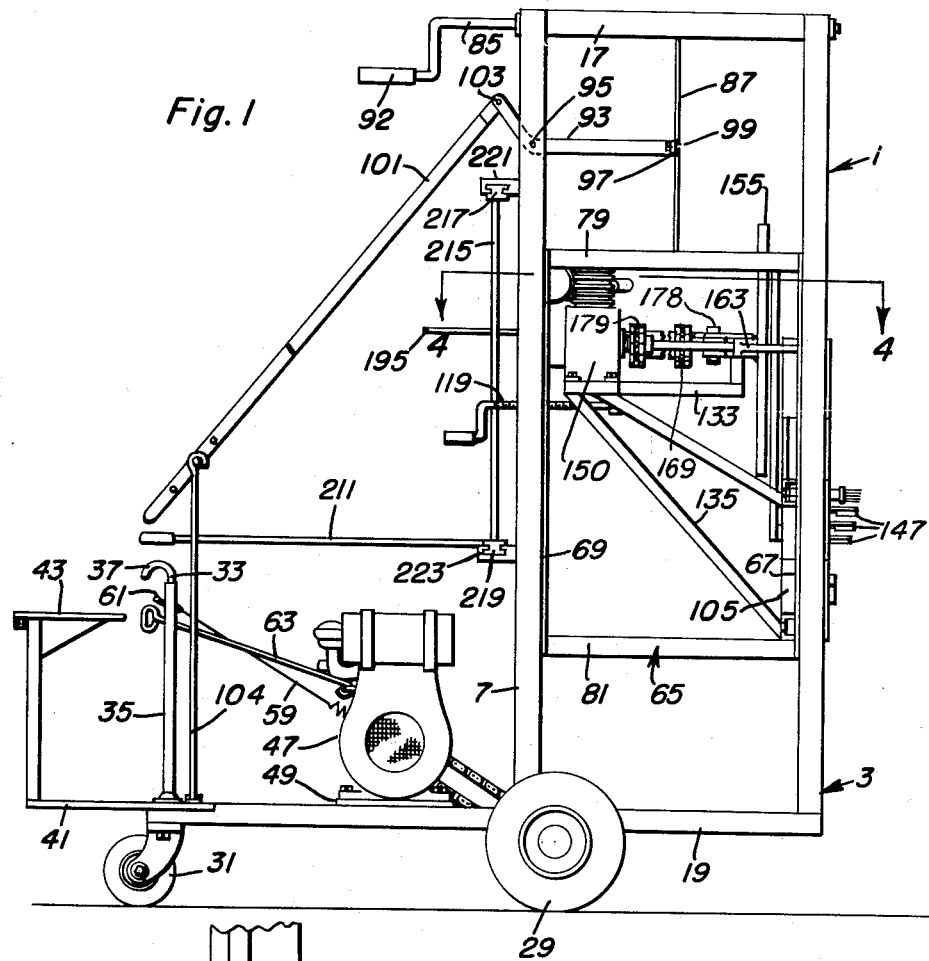
Figure 1 is a view in side elevation of my improved machine in the preferred embodiment thereof.

Referring to the drawings by numerals, the machine of my invention comprises a mobile carriage 1 including an upstanding rectangular, main skeleton, front frame 3.

The front frame 3 includes as its basic components, front and rear corner angle iron uprights 5, 7, front, top and bottom horizontal bars 9, 11, cross connecting the front uprights 5, rear, top and bottom horizontal bars 13, 15, cross connecting the rear uprights 7, top and bottom side bars 17, 19, cross connecting front and rear uprights 5, 7, at each side of said frame 3, and a V-shaped horizontal, bottom trailing frame 21 having its ends suitably connected to the bottom ends of the rear uprights 7. The frame 3 also includes other cross connecting bars presently referred to in detail.

A live axle 23 extending from side to side of the frame 3 adjacent the rear side thereof supports said frame and is journalled in bearings 25 on the bottom side bars 19. A pair of ground wheels 27, 29, are mounted on the ends of said axle, one being fast thereon for traction and the other loose thereon for turning of the machine. A steerable castor-type wheel 31, supports the trailing frame 21 at its apex and is suitably mounted on a steering post 33 rising through and rotatable on a steering post column 35 upstanding from and suitably fixed on said trailing frame 21, the steering post 33 being provided with an operating handle 37. Rearwardly extending arms 41 on the trailing frame 21 support an operator's seat 43 on a seat post 45 in the rear of the column 35.

A drive for the carriage 1 comprises a motor in the form of an internal combustion engine 47 mounted on a platform 49 on the trailing frame 21. A sprocket and chain drive 51 rendered operative, or inoperative, by a clutch 53 and clutch shifter 55 operatively connects the engine 47 to the axle 23 under control of any suitable forward and reverse drive gearing in the casing 57 on said engine 47, and an operating wire member 59 for the shifter 55 extends to and is slidably mounted in a sleeve 61 on the column 35 within easy reach of the operator on the seat 43. A pivoted gear shift lever 62 on the casing 57 is operative by a gear shifting rod 63 slidable in a guide eye 64 on the column 35.

A rectangular elevator frame 65 is mounted in the frame 3 for vertically slidable adjustment by means of upright front and rear corner angle bars 67, 69, slidably fitting in the corner uprights 5, 7. Horizontal upper and lower front bars 71, 73, connect the front corner angle bars 67, and similar rear bars 75, 77, connect the rear angle bars 69. Upper and lower horizontal side bars 79, 81, connect the corner bars 67, 69, at opposite sides of the elevator frame 65. The elevator frame 65 supports cutting mechanism for raising and lowering thereby, and which will subsequently be described in detail.

Means for raising and lowering the elevator frame 65 is provided comprising a cable windup reel 83 at the top of the frame 3 fastened on a shaft 85 journalled transversely and centrally of said frame 3 in the front and rear cross connecting bars 9, 13, of said frame 3. A cable 87 on said reel 83 is operatively connected by branch ends 89 to a longitudinal top center bar 91 of the elevator frame 65. A hand crank 92 on said shaft 85 provides for rotating the reel 83 to wind up and unwind the cable 87 for raising and lowering the elevator frame 65.

The elevator frame 65 is held in vertically adjusted position by detent means comprising a bell crank 93 pivoted, as at 95, at one side of the frame 3 on one upright 7 for vertical rocking movement, and provided on one end thereof with a lateral arm 97 extending over said frame 65 and connected to the cable 87, as at 99. A hand lever 101 for operating the bell crank 93 is pivoted, as at 103, to the other end of the bell crank 93 and inclines downwardly and rearwardly to within convenient reach of an operator on the seat 37. Pins 98 on the hand lever 101 spaced along the same are adapted to be selectively engaged with an eye 102 on an upright rod 104 rigidly attached to the trailing frame 21 to hold the lever 101 in different positions of longitudinal adjustment in which the bell crank 93 and arm 97 are rocked into different positions to hold the elevator frame 65 in different adjusted positions.

The previously mentioned cutting mechanism will now be described. At the front of the frame 3, an elongated X-shaped track 105 is rockably supported, with its major axis horizontal, on the elevator frame 65 by mounting means comprising a pair of horizontal axis shafts 106 extending oppositely from said track 105 and journalled in a pair of horizontal sleeves 108 extending from the front corner bars 67, of said elevator frame. The track 105, as best shown in Figure 6, is formed of a pair of spaced apart top and bottom, obtuse angled, channel bars 107, 109, and a pair of V-shaped channels 111 intermediate and spaced from said bars 107, 109, and forming therewith a pair of guideways 113, 115 open at the front and rear of the track 105 and intersecting at the centers thereof. The guideways 113, 115, incline downwardly oppositely from upper ends thereof, or of said track 105. End plates 117 close the ends of the guideways 113, 115. The beforementioned axis shafts 107 are suitably fixed in the angles of and support the V-shaped channel bars 111 which in turn, through the end plates 117, support the channel bars 107, 109.

Screw means for rockably tilting the track 105, which is to say the guideways 113, 115, is provided including a shaft 119 at the rear vertical center of the elevator frame 65 and having a hand crank 121 thereon within easy reach of an operator on the seat 43. The shaft 119 is threaded through a sleeve 123 pivoted, as at 125, for vertical swinging on a vertical bar 127 rising from a rear horizontal bar 129 on the elevator frame 65 and extending between the rear corner bars 69. The shaft 119 is swiveled, as at 131, on a skeleton platform 133 in the elevator frame 65 above the track 105 and which is supported by and suitably attached to pairs of downwardly and forwardly diverging arms 135 suitably secured to and carried by the ends of the track 105. As will be seen, by turning the shaft 119, in opposite directions, the platform 133 and arms 135 will be tilted vertically to tilt the track 105 and guideways 113, 115, vertically. The platform 133 serves another purpose presently clear.

A pair of elongated, like cutter carriages 136, 137, of bar form, with leading ends 141, and of less than half the length of the guideways 113, 115, are mounted in the track 105 for advance and retraction in the guideways 113, 115, respectively, on rollers 138 on front and rear sides of said carriages arranged so that the carriages fit in the said guideways against displacement therefrom. A series of cutter blades 143, 144, extend forwardly from the front side of the carriages 136, 137, respectively, horizontally, and are spaced equi-distantly apart and graduated in length to extend forwardly further from said carriages successively from the leading ends of said carriages to cut deeper successively in each series into a tree during advance of said carriages. The cutter blades 143, 144, are detachably held in the carriages 136, 137, by bolts 145, so that said blades are easily detached and replaced.

A power drive for the carriages 136, 137, for advancing and retracting the same is mounted on the track 105 and the platform 133 conjointly, for rockably tilting therewith. The power drive comprises an internal combustion engine 150 suitably fixed on the platform 133 at the rear thereof and in the vertical center of the track 105. The crankshaft 151 of the engine 150 extends forwardly therefrom and is journalled at its front end in a front bearing 153 on said platform 133.

A pair of driving disks 155, 157, associated with the carriages 136, 137, respectively, are fast above the shelf 133 and track 105 and adjacent the upper ends of the track 105, in the rear thereof on front ends of a pair of driven shafts 159 and 161, journalled in angled bearing brackets 163, 165, suitably fixed to and rising from the upper ends of the track 105. The shafts 159, 161, extend rearwardly above the platform 133 upon opposite sides of the crankshaft 151.

A pair of laterally spaced, free running sprockets 167, 169, on the shafts 151, respectively, with toothed clutch hubs 171, 173, are operatively connected by oppositely extending chains 175, 177, to sprockets 179, 181, fast on the shaft 159, and on a fixed shaft 166 on the bearing bracket 165. The sprocket 181 has fast thereon a gear pinion 176 meshing with a pinion 178 fast on the shaft 161. As will be seen, the chain 175 and sprocket 179 drive the shaft 159 in one direction, whereas, the chain 177, sprocket 181 and gear pinions 176 and 178 drive the shaft 161 in the opposite direction, whereby the disks 155, 157 are driven oppositely, relatively, in the directions indicated by the arrows in Figure 3. Pitman rods 183, 185, operatively connect the disks 155, 157, to the leading ends 141 of the carriages 136, 137, respectively. As will be seen, the sprockets 167, 179, and chain 175, on the one hand, and the sprockets 169, 181, and chain 177, on the other hand, form sprocket and chain drives from said crankshaft 151 to said disks 155, 157.

The driving disks 155, 157, are driven alternately through 360 degree cycles of movement from full cycle position shown in Figure 3 to advance the cutter carriages alternately from the upper ends of the guideways 113, 115, to the lower ends thereof and to retract said carriages alternately back to the upper ends of said guideways and in such timed relation that the carriages 136, 137, pass each other. In the full cycle position of the disks 155, 157, as shown in Figure 3, said carriages 136, 137, are in fully retracted position.

Automatic means is provided for timing the power drive for the carriages 136, 137, for advance and retraction of said carriages as specified. This automatic means alternately clutches the described belt and pulley drives from the crankshaft to the disks 155, 157, to connect said drives to said crankshaft 151, under controls presently described and includes the clutch hubs 171, 173. The automatic means further includes a slidably shiftable clutch member 191 splined, as at 193, see Figure 13, on the crankshaft 151 for movement in opposite directions into engagement with said hubs 171, 173, alternately to render said sprocket and chain drives to the disks 155, 157, alternately effective, said member being also shiftable on said shaft 151 into a neutral clutch disengaging position.

A clutch shifting lever 195 has a forked front end 197 pivoted, as at 198 on the bearing 153 so that said lever and forked end 197 may rock horizontally in opposite directions. A pivoted link 199 connects the clutch shifting lever 195 to said shiftable member 191 so that rocking of said lever 195 in opposite directions shifts said shiftable member 191 in opposite directions. The forked end 197 is rockably settable in opposite directions by operation of the lever 195 to interpose its terminals 201, 203, alternately into the path of upward revolution of a pair of tappet cams 205, 207, on the rear sides of the driving disks 155, 157, respectively, and which are associated with said terminals respectively. When either terminal 205, or 207, is so interposed and set, the shiftable member 191 clutches the sprocket and chain drive for one driving disk 155, or 157, to the crankshaft 151, so that the carriage 136, or 137, with which the disk is associated is advanced and retracted. As driving disks 155, 157, reach full cycle position, the tappet cam 205, 207, as the case may be, cams the associated terminal 201, or 203, rearwardly out of the path of the associated tappet cam and rocks said fork 197 to interpose the other terminal 201, 203, as the case may be, in the path of the associated tappet cams 205, 207. This rocking of the fork end 197 and lever sets the shiftable member 191 to clutch the other sprocket and chain drive to the crankshaft 151, so that the other carriages 136 or 137, as the case may be, will be advanced and retracted. This alternate clutching of the sprocket and chain drives for the carriages 136, 137, will continue until the clutch shifting member 191 is set into neutral drive disabling position by the clutch shift lever 195. In that position of said clutch shifting lever 195, it disengages said member 191 from both clutch hubs 171, 173, as will be understood.

A hand lever 211 is provided for manually operating the clutch shifting lever 195, and means compensating for horizontal rocking of said clutch shifting lever 195 as well as for vertical tilting of said lever 195 with the power drive for the carriages 136, 137. The compensating mechanism comprises a pair of spaced vertical rods 213, 215, in the rear of the frame 3 and between which the lever 195 is interposed for horizontal rocking and vertical tilting. The rods 213, 215, are fixed at upper and lower ends thereof in slide blocks 217, 219, sliding in upper and lower horizontal guide bars 221, 223, fixed on upper and lower horizontal rear bars 225, 227, on the frame 3. The hand lever 211 is fixed to the lower block 219 and extends rearwardly to within easy reach from the seat 43 for convenient operation by the operator on the seat.

As will now be seen, the hand lever 211, clutch shifting lever 195, link 199, and shiftable clutch member 191, together with the hubs 171, 173, comprise a manual control for the power drive for the carriages 136, 137, whereby said drive may be manually controlled for driving said carriages alternately selectively. Also, the clutch shifting lever 195, and forked end 197, together with the link 199, shiftable clutch member 191 and hubs 171, 173, provide for automatic control of the motor drive for the carriages to alternately advance and retract said carriages relatively, under control of the driving disks 155, 157.

Figure 7:
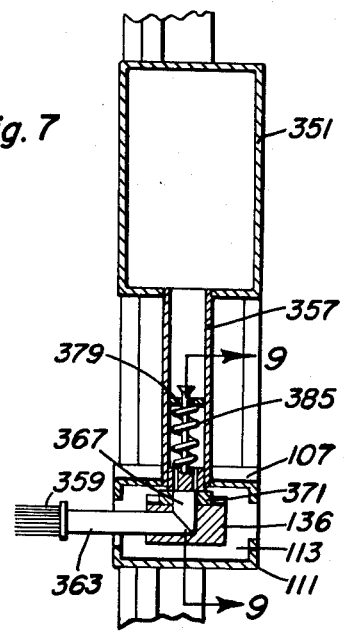
Figure 7 is an enlarged fragmentary view in vertical transverse section taken on the line 7—7 of Figure 3.
Figure 10:
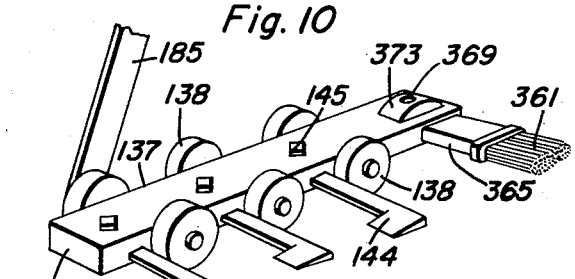
Figure 10 is an enlarged view in perspective of one of the cutter carriages and parts thereon.

To prevent infection of trees being scarred, or gashed, the machine of my invention is provided with automatic means associated with each carriage 136, 137, for coating the scar or gash with a suitable acid. This means comprises a pair of acid containing and discharging tanks 351, 353, above the upper ends of the track 105, and the guideways 113, 115, supported by legs 355, 357, on said track 105. A pair of brushes 359, 361, extend forwardly horizontally from the carriages 136, 137, at the trailing ends thereof. The brushes 359, 361, are secured on hollow acid feed tubes 363, 365, extending forwardly horizontally from the trailing ends of the carriages 136, 137, and having filler necks 367, 369, extending upwardly out of the trailing ends of said carriages into resilient cam collars 371, 373, fixed on top of the carriages. Acid discharge pipes 375, 377, depend from the tanks 351, 353, and open through the top of the track 105 at the upper ends of the guideways 113, 115, and with which the necks 367, 369, are vertically aligned in the fully retracted position of the carriages 136, 137. An upwardly opening spring loaded valve 379 is provided in the lower end of each discharge pipe 375, 377, the valve 371 for discharge pipe 375, being shown in Figures 7, 9. The valves 379 are each provided with a ported resilient cam plug 381, slidable in the lower end of the discharge pipes 375, 377, and extending into the upper ends of the guideways 113, 115, into the path of movement of the cam collars 371, 373, the arrangement being such that as the carriages 113, 115, move into retracted position, the cam collars 371, 373, frictionally coact with the cam plugs 381, to open the valves 379, so that the acid may feed to the brushes 359, 361, to saturate the same. The valves 379 are open in opposition to the springs, for instance spring 385, which load the valves so that the cam collars 371, 373, and cam plugs 381, frictionally coact under spring pressure to frictionally hold the carriages 136, 137, in retracted position and the driving disks 155, 157, against overthrow revolution pass full cycle position. As will be manifest, the acid passes from the discharge pipes 335, 377, to the feed tubes 363, 365, through the cam plugs 381.

A gable top guard 390 fixed in the bottom of the track 105 in the bottom angle thereof and projecting slightly forwardly of said track prevents cuttings from falling into the usual gum receiving cup 391, on the tree 393 being scarred, or gashed by the machine.

In operating the described machine, the same is driven up to the trunk of a tree 393, with the track facing said trunk. The elevator frame 65 is then raised or lowered, by operation of the shaft 85 to wind or unwind the cable 87, until the track is positioned for scarring or gashing at approximately the desired height on the trunk of the tree 393. This is done with the platform 133 substantially horizontal and the track 105 substantially vertical, as shown in Figure 1, and, of course, with the cutter carriages 136, 137, retracted and the driving disks 155, 157, in full cycle position. The track 105 is then tilted, as shown in Figure 5, by operation of the shaft 119, and the machine is maneuvered so that the top of the track 105 and the upper halves of the guideways 113, 115, straddle the trunk of the tree 393, with the intersection of the said guideways centered approximately relative to said trunk. The engine 150 is then started, by any suitable control, not shown, to start the power drive of the carriages 136, 137, and the shiftable clutch member 191 is shifted from neutral position by operation of the hand lever 211, to engage said member with one or the other of the hubs 171, 173, and thereby initiate drive of one cutter carriage, 136, 137, for advance and retraction thereof.

As the carriage which has been thus advanced is retracted, and the driving disk 155, or 157, associated therewith nears its full cycle position, the power drive for the carriages 136, 137, is automatically controlled in the manner described to disable the drive to the advanced and retracted carriage and render said power drive effective to advance and retract the other carriage. As each carriage 136, 137, advances, it cuts during approximately one-half of its advance movement, one-half of a V-shaped scar or gash 395, in the trunk of the tree 393, because as soon as it begins to travel downwardly past the intersection of the guideways 113, 115, it, together with the cutter blades 143, moves away from the trunk of the tree. This follows because, when the track 105 is tilted as described, said track 105 and guideways 113, 115, above the longitudinal major axis of the track 105, are tilted forwardly, or toward the trunk of the tree 395, whereas, said track 105 and guideways 113, 115, below said horizontal axis are tilted rearwardly away from said trunk. As the carriages 136, 137, advance, the cutter blades 143 cut progressively deeper, in each series, and the scar or gash 395 is coated with acid by the brushes 359, 361. By varying the angle at which the track 105 is tilted, the depth of the scar or gash 395 may be varied without changing the position of the machine relative to the trunk of the tree 393.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What is claimed as new is as follows:

1. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree trunk, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree trunk, and a power drive for the frame for moving the same up to a tree trunk.

2. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree, and a power drive for the frame for moving the same up to a tree and automatic means to apply acid in said gash during advance and retraction of the carriages.

3. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree, and a power drive for the frame for moving the same up to a tree, said first named means including horizontal journalled axis shafts extending horizontally oppositely from said track.

4. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree, and a power drive for the frame for moving the same up to a tree, said first named means including an elevator in said frame on which said track is rockably mounted, and manually operative means for raising and lowering said elevator to vary the height of said track relative to the tree to vary the height of the gash cut therein.

5. The combination of claim 2, said automatic means being controlled by said carriages.

6. The combination according to claim 2, said automatic means comprising acid discharge means on said track, acid applying means on said carriages and means controlled by said carriages for feeding acid from said discharge means to said applying means.

7. The combination according to claim 2, said automatic means comprising acid discharge means on said track, acid applying means on said carriages and valve means associated with said discharge means and opened by said carriages for feeding acid from the discharge means to the applying means.

8. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree, and a power drive for the frame for moving the same up to a tree, the first named power drive comprising a motor, a pair of driving disks operatively connected to said carriages respectively, and means automatically connecting said motor to said disks alternately.

9. The combination according to claim 8, said last means including a clutch member shiftable in opposite directions into clutching positions, and cam and rocker means operative by said disks for shifting said clutch member.

10. The combination according to claim 9, said last named means including a clutch member shiftable in opposite directions into clutching positions, rocker means for shifting said clutch member, a clutch shifting lever operatively connected to said rocker to shift the clutch member in one direction, and cams on said disks for operating said rocker to shift the clutch member in opposite directions after operation of said rocker by said lever.

11. In a tree scarring machine, a mobile upstanding main frame, an elongated X-shaped track forming a pair of downwardly inclining guideways intersecting at the center thereof to form an upper V-shaped guideway, means rockably mounting said track in said frame for tilting against a tree trunk with the V-shaped guideway straddling the tree, a pair of cutter carriages in said guideways movable therein downwardly and upwardly to advance and retract the same, a power drive in said frame for said carriages, means to control said power drive to advance and retract said carriages alternately relatively, whereby to cut a V-shaped gash in the tree, and a power drive for the frame for moving the same up to a tree, said first named means including an elevator in said frame on which said track is rockably mounted, and lifting means for raising and lowering said elevator to vary the height of said track relative to the tree trunk to vary the height of the gash cut in the tree trunk.

References Cited in the file of this patent

UNITED STATES PATENTS

| | | |
|---|---|---|
| 2,186,654 | Perry | Jan. 9, 1940 |
| 2,592,900 | Hough | Apr. 15, 1952 |

OTHER REFERENCES

Ryberg et al., "Research in Equipment for the Production of Gum Naval Stores." Engineering Progress at the Univ. Fla., vol. 3, No. 6, Aug. 1949, pp. 1–20, Tech. Paper Series No. 32, Fla. Eng. & Ind. Expt. Sta., Univ. Fla., Gainesville, Fla. Same article, published June 1949 in J. Fla. Engineering Soc., vol. 3, pp. 50–69.